(12) United States Patent
Lemaire et al.

(10) Patent No.: US 7,104,303 B2
(45) Date of Patent: Sep. 12, 2006

(54) STABILIZER FOR CANTILEVERED TIRE BUILDING DRUM

(75) Inventors: Michel Lemaire, Habay-la-Neuve (BE); Francis Cornet, Habay-la-Vieille (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 152 days.

(21) Appl. No.: 11/007,829

(22) Filed: Dec. 8, 2004

(65) Prior Publication Data

US 2005/0103448 A1    May 19, 2005

Related U.S. Application Data

(62) Division of application No. 10/234,809, filed on Sep. 4, 2002, now Pat. No. 6,863,760.

(60) Provisional application No. 60/323,822, filed on Sep. 21, 2001.

(51) Int. Cl.
*B29D 30/26* (2006.01)
(52) U.S. Cl. ...................... 156/414; 156/396
(58) Field of Classification Search ............ 156/110.1, 156/131, 396, 398, 403, 414–420
See application file for complete search history.

(56) References Cited

U.S. PATENT DOCUMENTS 3,944,456 A    3/1976  Cantarutti

| 4,048,002 A | 9/1977 | Mallory |
|---|---|---|
| 4,230,517 A | 10/1980 | Enders |
| 4,314,864 A | 2/1982 | Loeffler et al. |
| 4,443,290 A | 4/1984 | Loeffler et al. |
| 4,877,468 A | 10/1989 | Siegenthaler |
| 2003/0056877 A1 | 3/2003 | Zeh et al. |
| 2003/0056878 A1 | 3/2003 | Lemaire et al. |
| 2003/0056881 A1 | 3/2003 | Lemaire et al. |

FOREIGN PATENT DOCUMENTS

| EP | 0666165 | 1/1995 |
|---|---|---|
| GB | 372043 | 5/1932 |
| JP | 57142345 | 9/1952 |

*Primary Examiner*—Geoffrey L. Knable
(74) *Attorney, Agent, or Firm*—Howard M. Cohn

(57) ABSTRACT

Method and apparatus for stabilizing a fire building drum wherein the fire building drum has two ends, is permanently supported at a single cantilever support end, and the remaining end is a free end. The method comprises providing a free end support engaged with the free end to stabilize the tire building drum by restricting lateral movement of the free end; and freeing the free end by temporarily retracting the free end support when desired, e.g., to enable application of annular fire components on the tire building drum, or to enable removal of a built tire from the fire building drum. Preferably, the free end support allows rotation of the fire building drum while the free end support is engaged with the free end. A preferred embodiment uses overtravel of actuator linkages stopped against an extension stop to lock the free end support in place, engaged with the free end, to stabilize the tire building drum without requiring continued power input.

7 Claims, 7 Drawing Sheets

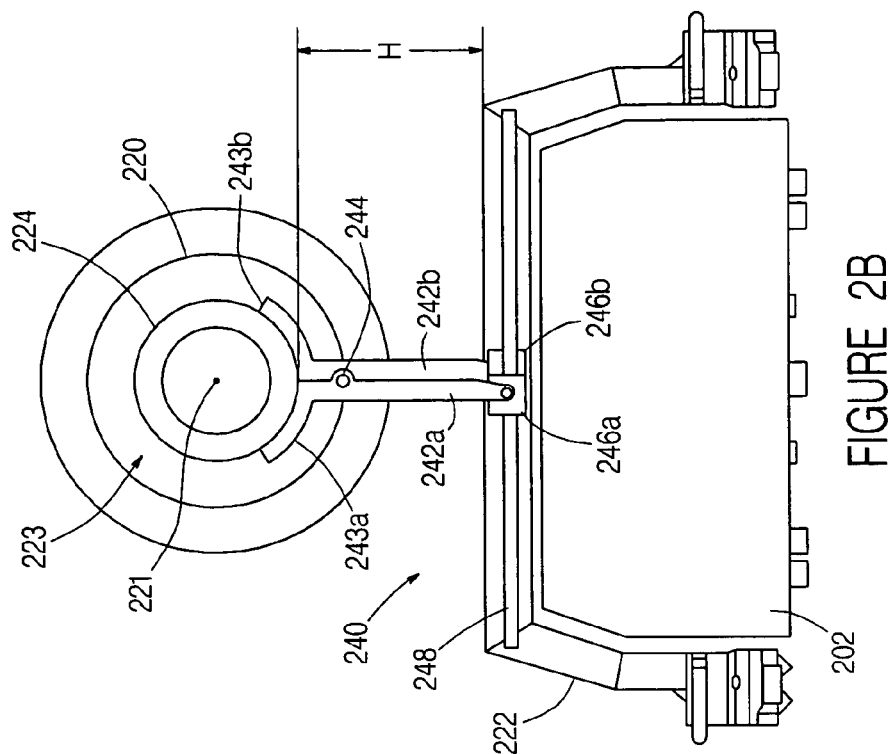
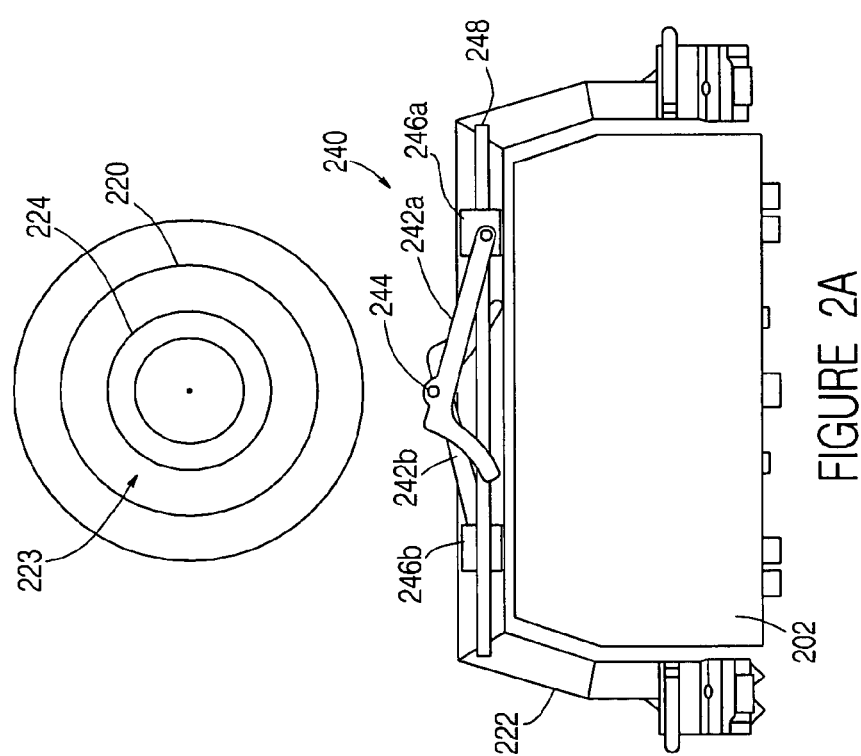

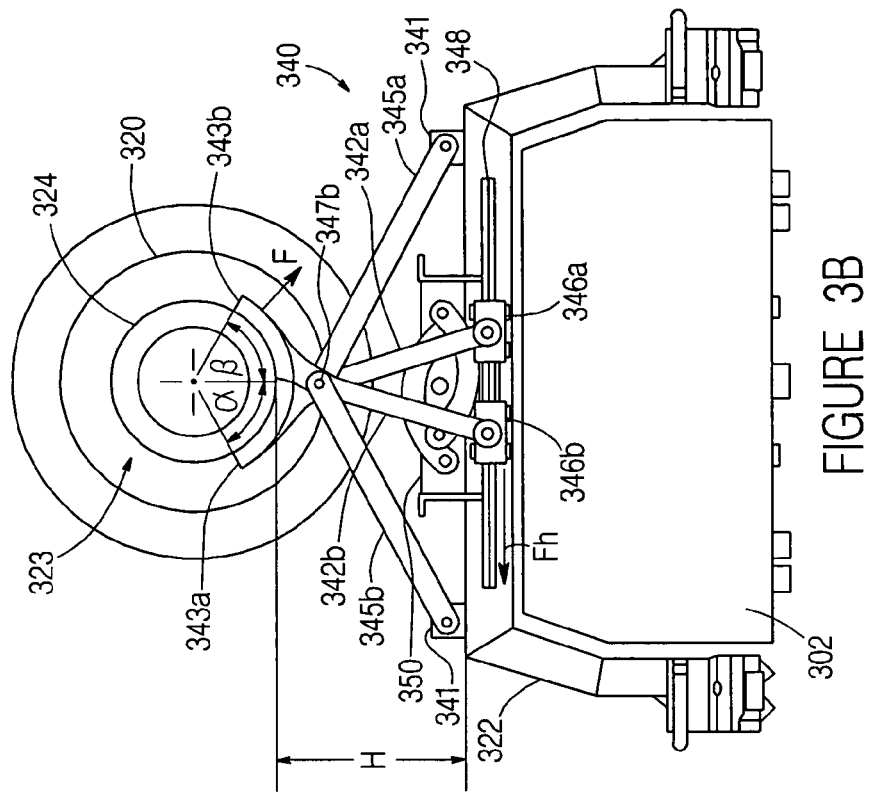
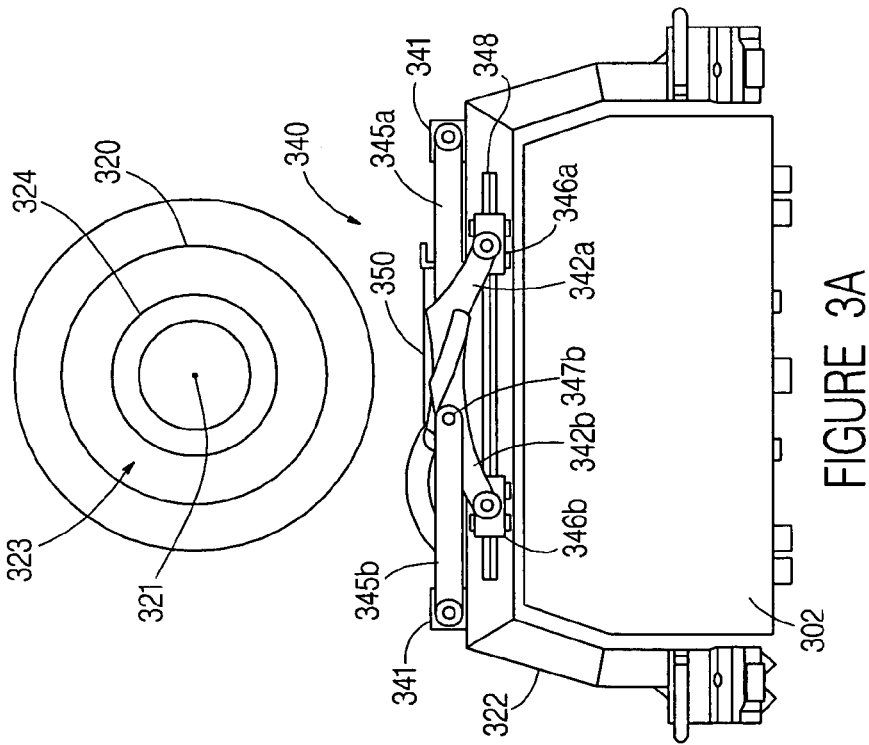
FIGURE 3B
FIGURE 3A

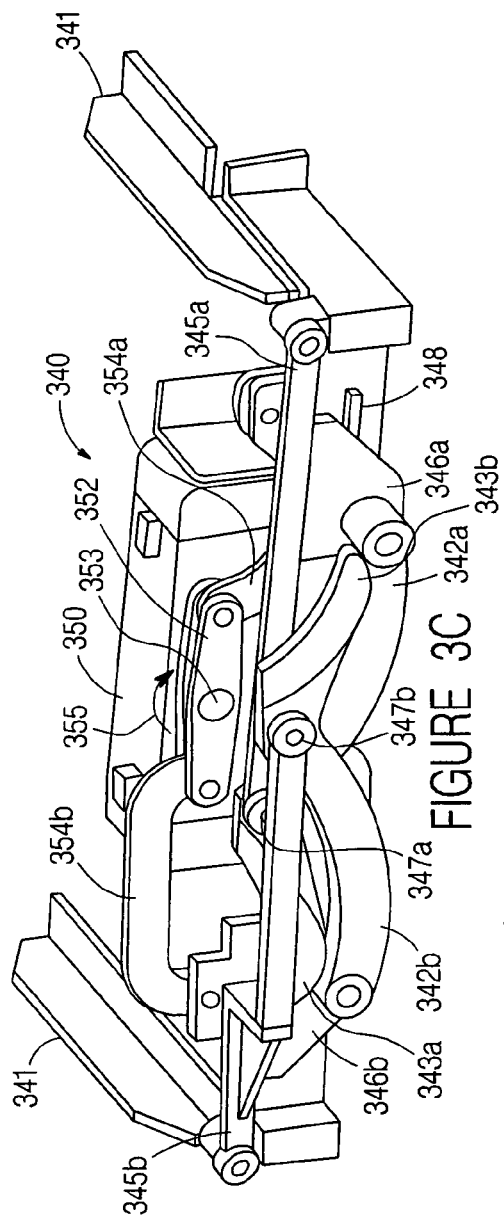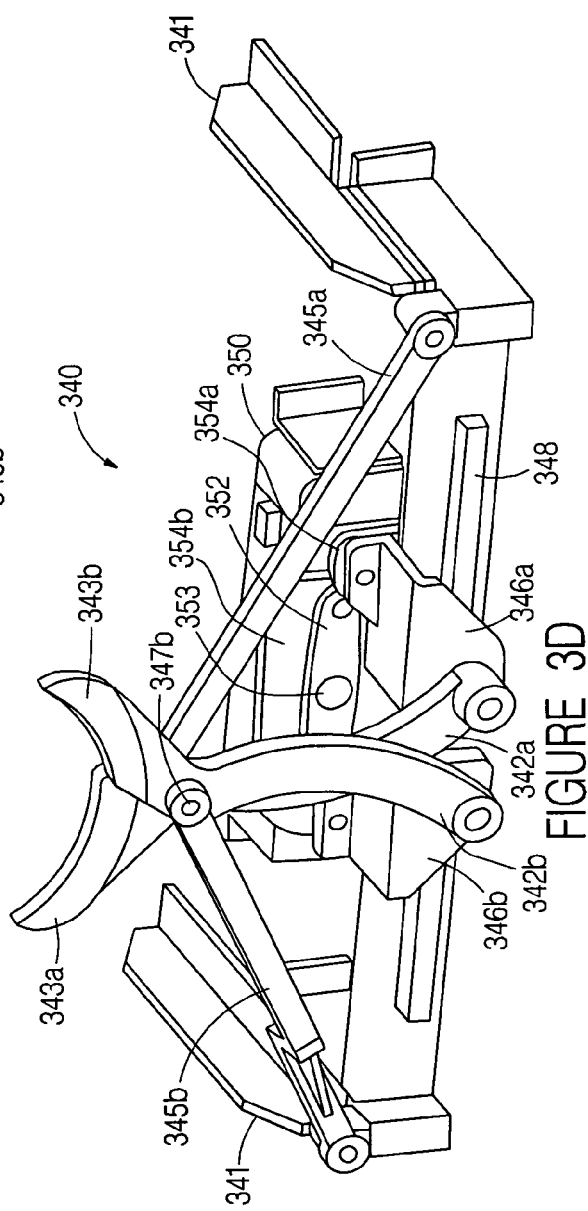

STABILIZER FOR CANTILEVERED TIRE BUILDING DRUM

CROSS-REFERENCE TO RELATED APPLICATIONS

This is a Divisional application of U.S. application Ser. No. 10/234,809, now U.S. Pat. No. 6,863,760, having a filing date of Sep. 4, 2002 and a common assignee with the present application, which claims the benefit of U.S. Provisional Patent Application Ser. No. 60/323,822 filed on Sep. 21, 2001 by Cornet et al.

This application relates to U.S. patent application entitled METHOD FOR MANUFACTURING TIRES ON A FLEXIBLE MANUFACURING SYSTEM, Ser. No. 09/957,785, filed on Sep. 21, 2001 (now U.S. Pat. No. 6,773,530).

This application relates to U.S. patent application entitled PRECISION LONGITUDINAL REGISTRATION OF TIRE BUILD DRUM TO FMS WORK STATION, Ser. No. 09/957,731, filed on Sep. 21, 2001.

This application relates to U.S. patent application entitled PRECISION ALIGNMENT OF TIRE BUILDING DRUM TO AUTOMATED TIRE BUILDING SYSTEM WORKING AXIS, Ser. No. 09/960,078, filed on Sep. 21, 2001.

TECHNICAL FIELD OF THE INVENTION

The present invention relates to automated tire building machines and, more particularly, to methods and apparatus for stabilizing the free end of a cantilever mounted tire building drum in an automated tire building system.

BACKGROUND OF THE INVENTION

It is well known that the components of most pneumatic tire constructions must be assembled in a way which promotes good tire uniformity in order to provide proper tire performance. For example, a tread which "snakes" as it goes around the tire circumference will cause wobbling as the tire is operated. For example, a carcass ply which is lopsided (longer cords on one side of the tire than the other side) can cause a variety of tire nonuniformity problems including static imbalance and radial force variations. For example, a tire which is not meridionally symmetric (e.g., tread not centered between beads) can cause a variety of tire nonuniformity problems including couple imbalance, lateral force variations, and conicity. Therefore, in order to meet typical tire performance requirements, the tire industry generally expends considerable effort in producing tires with good uniformity. Tire uniformity is generally considered to mean tire dimensions and mass distributions which are uniform and symmetric radially, laterally, circumferentially, and meridionally, thereby producing acceptable results for measurements of tire uniformity including static and dynamic balance, and also including radial force variation, lateral force variation, and tangential force variation as measured on fire uniformity machines which run the fire under load on a road wheel.

Although certain degrees of fire nonuniformity can be corrected in post-assembly manufacturing (e.g., by grinding), and/or in use (e.g., applying balance weights to the rim of a tire/wheel assembly), it is preferable (and generally more efficient) to build-in tire uniformity as much as possible. Typical fire building machines comprise a tire building drum around which the fire components are wrapped in successive layers including, for example, an innerliner, one or more carcass plies, optional sidewall stiffeners and bead area inserts (e.g., apex), sidewalls, and bead wire rings (hereinafter simply referred to as "beads"). After this layering, the carcass ply ends are wrapped around the beads, the tires are blown up into a toroidal shape, and the tread/belt package is applied. Typically the tire building drum is in a fixed location on the plant floor, and the various layers of components are applied manually or automatically using tooling registered to reference points on the fixed drum in order to ensure component placement with the desired degree of precision. The tooling is generally fixed relative to the fire building drum, for example a guide wheel on an arm extending from the same frame (machine base) which supports the tire building drum.

The tire building drum must be supported in a way that allows beads, which are complete circles or rings, to be applied on the tire carcass as it is built in layers that are wrapped on the tire building drum. Also, there must be a way to remove a green fire when the fire building process on the fire building drum is completed. The fire building drum may be permanently supported on only one end, thereby creating a "free end" over which the beads may be applied, and the green fire may be removed. This single-ended support is commonly known as a cantilever mounting. An everyday example of a cantilever mounting is a diving board.

Various problems must be addressed for a cantilever mounted fire building drum, especially considering tire industry requirements for the uniformity of fires built on the drum, and also desires for durability of the manufacturing equipment. For example, large force moments are created on a cantilevered fire building drum support due to factors including the weight of the fire building drum, the weight of the tire components applied to the drum, and lateral forces (i.e., forces in any direction radial to the tire building drum axis of rotation) from the fire component application equipment (e.g., stitching rollers that press the components together). In cases wherein the tire building drum rotates during the tire building process, then these force moments can cause problems (e.g., unusual wear) for bearings positioned in the support to facilitate rotation of the drum. Tire uniformity is affected if the tire building drum is allowed to bend in response to the forces bearing on it which could, for example, cause a tire layer to be laid in a spiral. For a cantilever mounted drum, the bending could be along the length of the drum and/or could be involve pivoting where the tire building drum is held by the permanent support. To stabilize the tire building drum, i.e., to prevent drum bending and/or other undesirable movement, a cantilever mounted tire building drum must be more rigid and must involve much more substantial bearings and other connections to the single end support than comparable tire building drums that are supported on both ends. Obviously, such increased robustness costs more, generally adds to the overall weight, and produces equipment which is more complex and therefore more difficult and expensive to maintain. Finally, the present invention addresses the additional problems of cantilever mounted drum stabilization that arise when the tire building drum is no longer fixed, but instead is a work-piece in a flexible manufacturing system (FMS) wherein the building drum is moved between automated work stations for application of successive component layers in successive work stations. The context of the present invention is an FMS having work-pieces (tire building drums) which are too large to allow the use of a precision pallet conveyor, so the tire building drums are moved (propelled) by other means which are not necessarily able, by themselves, to achieve sufficient accuracy in positioning the tire building drums relative to the work stations. The work stations each have a centerline, or "working axis" of the work station tire assembly devices (tools), and the axis of the tire building drum must be precisely aligned with the working axis in each work station. Such alignment includes assuring that each point along the entire drum length of the tire building drum axis of revolution is within a specified precision distance of the work station working axis, i.e., alignment comprises making the tire building drum axis of revolution coincident with the work station working axis. Since the tire building drum is on a moving platform, it must maintain the desired alignment without imposing too great a weight burden on the moving platform. Furthermore, since the moving tire building drums may not be continuously connected to a power source, it is desirable that any drum support/stabilizer should be able to provide stabilizing support without the continuous application of power, be it electrical or air pressure or otherwise.

The present invention is intended to overcome the limitations of the prior art by providing method and apparatus for stabilizing a cantilever mounted tire building drum, particularly one that rotates, and particularly in the context of tire building drums that move from station to station through a flexible manufacturing system for tire building.

BRIEF SUMMARY OF THE INVENTION

According to the invention, there is disclosed a method for stabilizing a tire building drum wherein the tire building drum has two ends, is permanently supported at a single cantilever support end, and the remaining end is a free end. The method comprises the steps of: providing a free end support engaged with the free end to stabilize the tire building drum by restricting lateral movement of the free end; and freeing the free end by temporarily retracting the free end support when desired.

According to the invention, the step of freeing the free end is enacted to enable application of annular tire components on the tire building drum, or to enable removal of a built tire from the tire building drum. Preferably, the step of freeing the free end comprises the steps of: retracting the free end support to disengage the free end support from the free end in a way that allows unbroken circular objects to be applied to or removed from the tire building drum; waiting until the free end no longer needs to be free; and extending the free end support until the free end support is engaged with the free end to stabilize the tire building drum by restricting lateral movement of the free end.

According to the invention, the method further comprises the step of allowing rotation of the tire building drum while the free end support is engaged with the free end.

According to the invention, the method is characterized by stabilizing the tire building drum by restricting lateral movement of the free end in all directions radial to an axis of rotation of the tire building drum. Alternatively, the method is characterized by: stabilizing the tire building drum by restricting lateral movement of the free end in directions radial to an axis of rotation of the tire building drum. The directions are within plus or minus 90 degrees of the vertically downward direction. Alternatively, the directions are within plus or minus 45 degrees of the vertically downward direction.

According to the invention, the method further comprises the step of locking the free end support in place, engaged with the free end to stabilize the tire building drum without requiring continued power input. Preferably, the step of locking comprises: moving mechanical elements that extend the free end support past the point that causes the free end support to be engaged with the free end; and providing a stop for the mechanical elements at a point such that forces (F, Fh, Fv) resulting from lateral movement of the free end act to hold the free end support in a state of engagement with the free end.

According to the invention, apparatus for stabilizing a tire building drum (120, 220, 320), wherein the tire building drum has two ends, is permanently supported at a single cantilever support end, and the remaining end is a free end; the apparatus comprising: means for providing a free end support engaged with the free end to stabilize the tire building drum by restricting lateral movement of the free end; and means for freeing the free end by temporarily retracting the free end support when desired.

According to the invention, the apparatus further comprises: means for retracting the free end support to disengage the free end support from the free end in a way that allows unbroken circular objects to be applied to or removed from the tire building drum; control means for waiting until the free end no longer needs to be free; and means for extending the free end support until the free end support is engaged with the free end to stabilize the tire building drum by restricting lateral movement of the free end.

According to the invention, the apparatus further comprises: means for allowing rotation of the tire building drum while the free end support is engaged with the free end.

According to the invention, the apparatus further comprises means for stabilizing the tire building drum by restricting lateral movement of the free end in all directions ($\alpha$, $\beta$) radial to an axis of rotation of the tire building drum. Alternatively, the apparatus further comprises means for stabilizing the tire building drum by restricting lateral movement of the free end in directions ($\alpha$, $\beta$) radial to an axis of rotation of the tire building drum, the directions being within plus or minus 90 degrees of the vertically downward direction. Alternatively, the directions are within plus or minus 45 degrees of the vertically downward direction.

According to the invention, the apparatus further comprises means for locking the free end support in place, engaged with the free end, to stabilize the tire building drum without requiring power input. Preferably, the apparatus further comprises means for moving mechanical elements that extend the free end support past the point that causes the free end support to be engaged with the free end; and means for providing a stop for the mechanical elements at a point such that forces (F, Fh, Fv) resulting from lateral movement of the free end act to hold the free end support in a state of engagement with the free end.

According to the invention, apparatus is disclosed for locking a tire building drum free end support in place, extended and engaged with the free end, to stabilize the tire building drum without requiring power input, the apparatus comprising: two support arms that are extendable to engage with the free end; a sliding block connected to each support arm and sliding on a slide rail for extending the support arms; a rotary actuator to use power input for extending the support arms; actuator linkages connected between the rotary actuator and the sliding blocks for converting rotary motion to horizontal sliding motion, the actuator linkages comprising: a rotary link attached at its center to a rotary actuator shaft, a first slide link pivotably connected at one end to a first end of the rotary link and pivotably connected at the other end to a first sliding block, and a second slide link pivotably connected at one end to a second end of the rotary link and pivotably connected at the other end to a second sliding block; rotational motion of the rotary link characterized in that: a rotation angle of zero degrees causes the actuator linkages to be aligned in a way that spreads the sliding blocks farthest apart, thereby fully retracting the support arms; and a rotation angle of 180 degrees causes the actuator linkages to be aligned in a way that pulls together the sliding blocks as much as possible, thereby fully extending the support arms; and an extension stop that stops rotation of the rotary link in an overtravel state characterized in that the rotary link has rotated past the 180 degree point that caused full extension of the support arms.

The present invention is particularly useful in conjunction with a system for simultaneously building a plurality of tire carcasses, such as is disclosed in the commonly owned, copending U.S. patent application entitled METHOD FOR MANUFACTURING TIRES ON A FLEXIBLE MANUFACTURING SYSTEM, Ser. No. 09,957,785, filed on Sep. 21, 2001. The method disclosed therein generally comprises the tire building steps of establishing a sequence of at least three and up to ten work stations; advancing at least three disconnected tire building drums along a working axis extending through the at least three work stations; and applying one or more tire components to the tire building drums at each of the work stations. Then the resulting green tire carcass is removed at the last of the work stations. Finally, the tire building drum is advanced from the last work station after the green carcass has been removed to the first work station. The tire building drums are each independently advanced along the working axis. Each of the disconnected tire building drums are advanced along the working axis so that the axis of rotation of the disconnected tire building drums is aligned with the working axis. The plurality of disconnected (i.e., independently movable, not connected to one another) tire building drums can be substantially simultaneously advanced along a working axis with self propelled devices to which the tire building drums are mounted from one work station to another. The tire building drums are advanced along the working axis so that an axis of rotation through the building drum is maintained at a constant predetermined height and location and in parallel alignment with the working axis. An intake server is located at each of the work stations for operating the tire building drums. The intake servers are coupled to the building drums while maintaining the axis of rotation through the building drums at the constant predetermined height and location and in parallel alignment with the working axis. The intake server at each of the work stations move from their normally retracted position outward across the working axis into a position to couple to that tire build drum. Then the building drums are uncoupled from the intake servers after the tire component(s) have been applied to the building drums. Next, the intake server at each of the work stations are retracted to their normally retracted position, prior to the now uncoupled tire building drum advancing to the next work station. The step of applying one or more tire components to the tire building drums at each of the work stations includes applying the tire components to the fire building drums while maintaining the axis of rotation through the building drums at the constant predetermined height and location and in parallel alignment with the working axis. This is accomplished by providing one or more application drums at each of the work stations for applying the tire component(s) to the building drums. The application drums are moved from their normal retracted position away from the working axis to a location where the tire components can be applied to the building drums while maintaining the axis of rotation through the building drums at the constant predetermined height and location and in parallel alignment with the working axis. Then the application drums are retracted at each of the work stations to their normally retracted position, prior to advancing the tire building drum to the next work station.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1A:
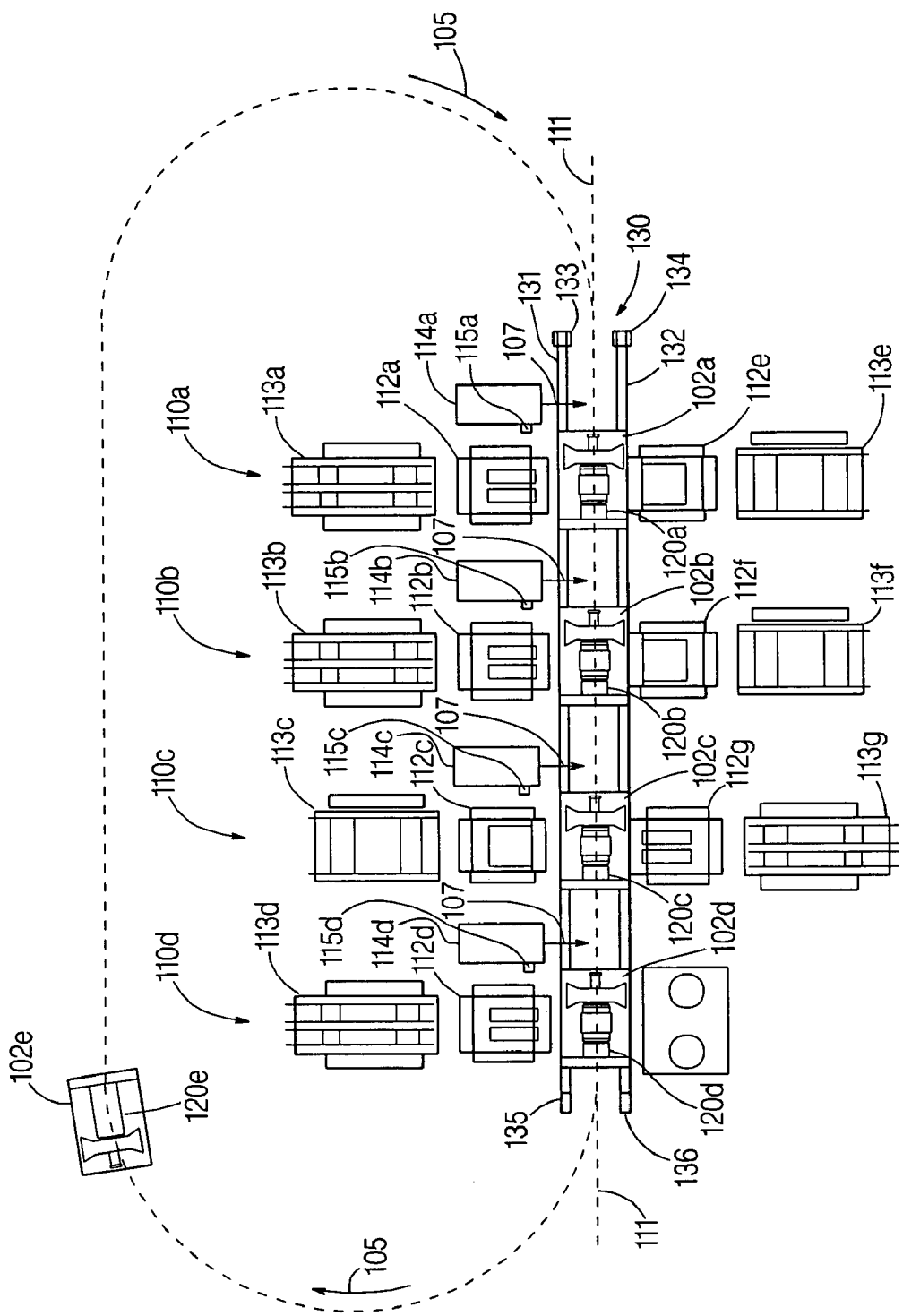

Elements of the figures are typically numbered as follows. The most significant digit (hundreds) of the reference number corresponds to the figure number. Elements of FIG. 1 are typically numbered in the range of 100–199. Elements of FIG. 2 are typically numbered in the range of 200–299. Similar elements throughout the drawings may be referred to by similar reference numerals. For example, the element 199 in a figure may be similar, and possibly identical to the element 299 in another figure. Elements of the figures can be numbered such that similar (including identical) elements may be referred to with similar numbers in a single drawing. For example, each of a plurality of elements collectively referred to as 199 may be referred to individually as 199a, 199b, 199c, etc. Or, related but modified elements may have the same number but are distinguished by primes. For example, 109, 109', and 109" are three different elements which are similar or related in some way, but have significant modifications, e.g., a fire 109 having a static imbalance versus a different tire 109' of the same design, but having a couple imbalance. Such relationships, if any, between similar elements in the same or different figures will become apparent throughout the specification, including, if applicable, in the claims and abstract.

Figure 1B:
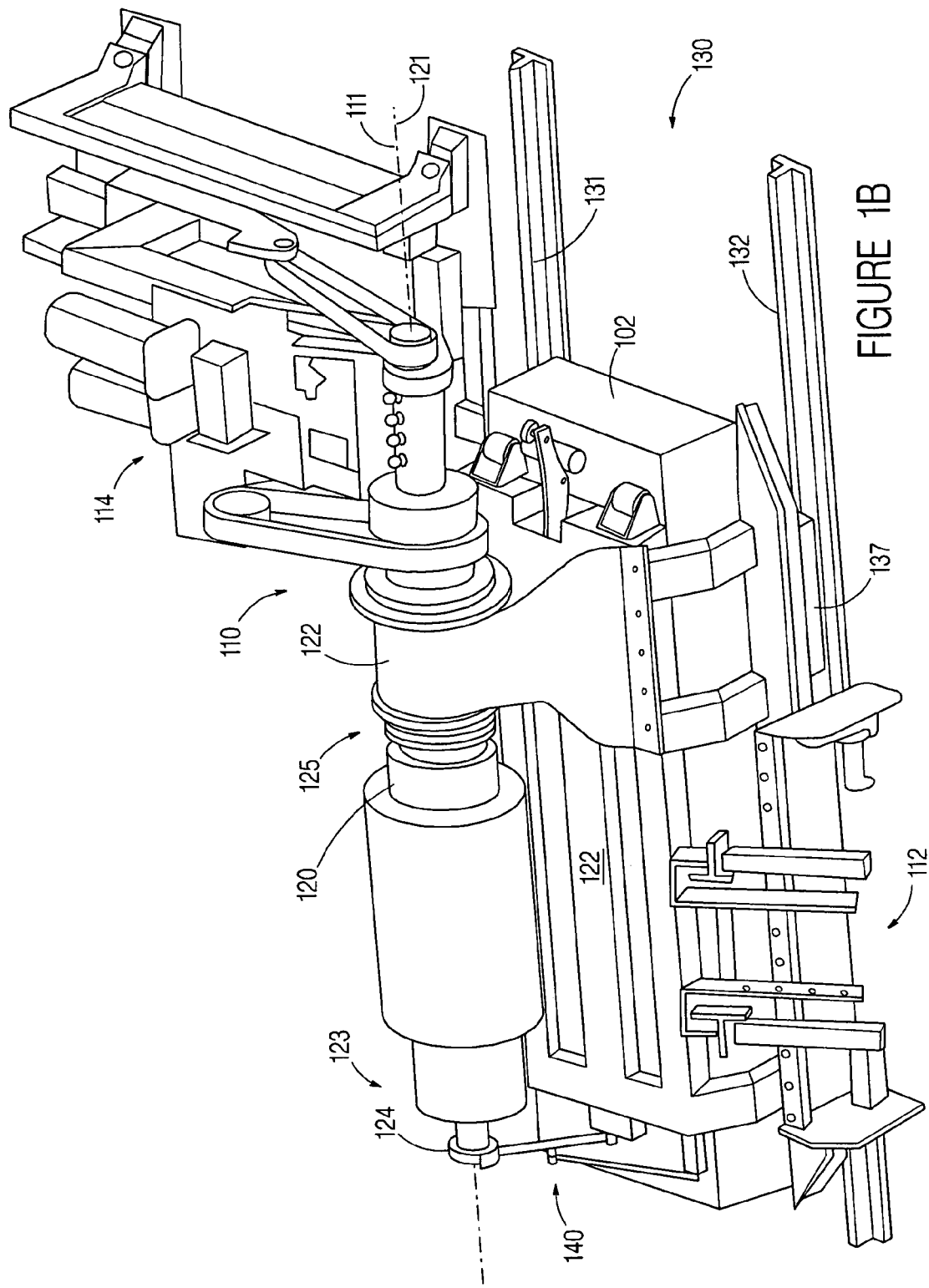
Figure 1C:
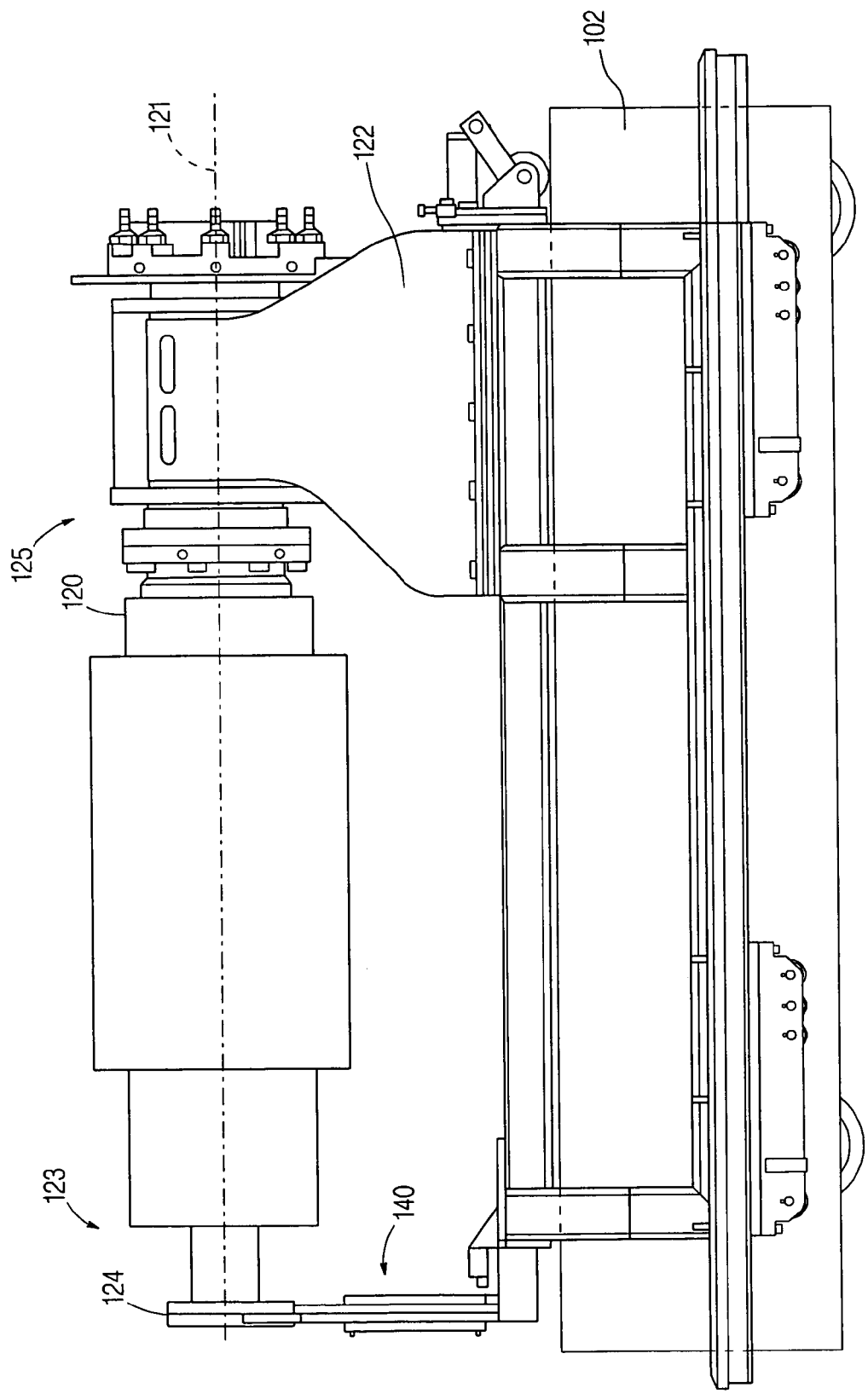
Figure 4A:
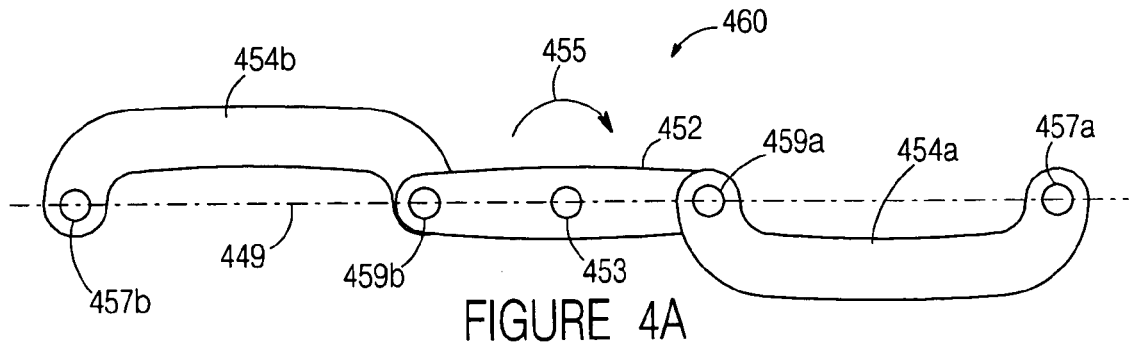
Figure 4B:
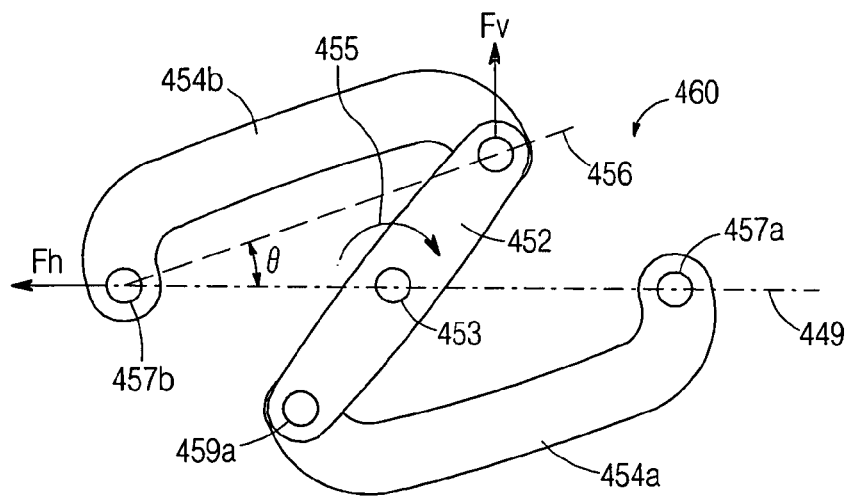
Figure 4C:
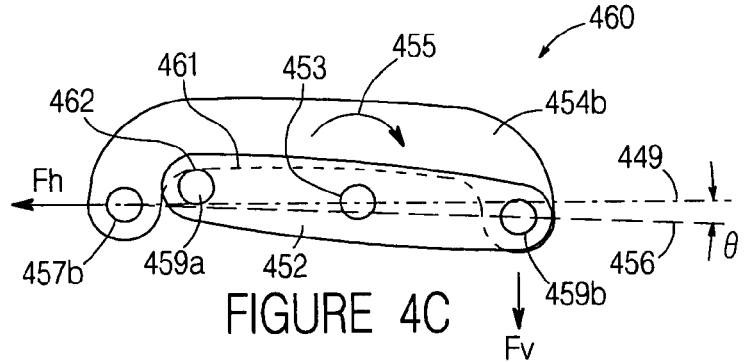

The structure, operation, and advantages of the present preferred embodiment of the invention will become further apparent upon consideration of the following description taken in conjunction with the accompanying drawings, wherein:

FIG. 1A is a schematic view of an automated tire building system (FMS), according to the invention;

FIG. 1B is a perspective view of a workstation of the FMS showing a tire building drum in precision placement relative to an application drum, according to the invention;

FIG. 1C is a side view of a tire building drum cantilever mounted on a drum support frame with the free end stabilized by a free end support, according to the invention;

FIGS. 2A and 2B are end views of a first embodiment of a free end support, showing the support retracted in FIG. 2A, and extended to support a tire building drum in FIG. 2B, according to the invention;

FIGS. 3A and 3B are end views of a second, preferred embodiment of a free end support, showing the support retracted in FIG. 3A, and extended to support a tire building drum in FIG. 3B, according to the invention;

FIGS. 3C and 3D are perspective end views of the preferred embodiment of a free end support, showing the support retracted in FIG. 3C, and extended in FIG. 3D, according to the invention;

FIG. 4A is a schematic end view of an actuator linkage for the free end support of FIGS. 3A–3D, showing the actuator linkages in position for the retracted state of the free end support as shown in FIG. 3C, according to the invention;

FIG. 4B is a schematic end view of the actuator linkages of FIG. 4A, showing the actuator linkages in position as the free end support is partly extended, according to the invention; and FIG. 4C is a schematic end view of the actuator linkages of FIG. 4A, showing two of the three actuator links in position for the extended state of the free end support as shown in FIG. 3D, with the links locked in position by overtravel, according to the invention.

DETAILED DESCRIPTION OF THE INVENTION

The present invention concerns stabilizing a free end of a cantilever mounted tire building drum. The free end of the tire building drum is the axial end opposite to the axial end that is cantilever mounted to a fixed drum support. The stabilizing is intended to provide extra support of the free end to minimize bending, tilting or other movement of the tire building drum, especially during tire building operations. A secondary purpose of the stabilizing is to reduce stress and resultant wear on bearings and other mechanical elements of the tire building drum and associated components. The cantilever mounting is generally utilized so that beads (wire bead rings), which are pre-assembled complete rings, can be applied to the tire building drum by being threaded over the free end; and also so that completed tire carcasses can be removed from the tire building drum after building, by sliding the built carcass off of the free end. Therefore, a requirement of the stabilizer is that it must be removable or otherwise disconnectable to allow bead application and carcass removal.

The present invention is described in the context of an automated tire building system (FMS or flexible manufacturing system) that requires precise positioning of machine components such as the tire building drum in order to manufacture tires with a high degree of tire uniformity. Although the embodiments and concepts disclosed herein are described in this context, it should be understood that the inventive devices and methods for stabilizing are applicable to any cantilever mounted tire building drum, rotating or not rotating, movable between workstations or fixed in place.

The automated tire building system is designed to enable precision placement of a tire building drum relative to tools (tire building devices such as "application drums") of a work station when the tire building drum comprises a moving work-piece in an automated tire building system having one or more work stations, and the tire building drum is moved (propelled) into and out of each work station. The application drums of each work station are aligned vertically and horizontally to a working axis, and are positioned longitudinally along the working axis, which working axis preferably extends linearly through all of the one or more work stations in sequence from first to last, such that the first tire building operations are performed in the first work station, and the last tire building operations are performed in the last work station. Thus, precision placement of the tire building drum at each work station can be accomplished by precisely aligning the axis of the tire building drum to the working axis at each work station, and by precisely positioning a tire building drum longitudinal reference point to a corresponding work station longitudinal reference point at each work station. The tire building drums are cantilever mounted, so a free end support that stabilizes the free end of the tire building drum will further assist in maintaining alignment of the axis of the tire building drum to the working axis at each work station. Tire building drums are typically too large to allow the use of a precision pallet conveyor so, in the described system, the tire building drums are moved by self-powered vehicles riding on wheels upon the plant floor. Since the vehicles, by themselves, are unable to achieve sufficient accuracy in positioning the tire building drums relative to the work station application drums, the system includes additional methods and means for precision placement of the tire building drum.

FIG. 1A illustrates an embodiment of a tire building system (FMS) 100 as disclosed in commonly owned, co-pending U.S. patent application Ser. No. 09/957,785, entitled METHOD FOR MANUFACTURING TIRES ON A FLEXIBLE MANUFACURING SYSTEM, filed on Sep. 21, 2001, incorporating the drum stabilizing methods and means of the present invention. A plurality of self-powered automatic guided vehicles (AGVs) 102*a*, 102*b*, 102*c*, 102*d*, 102*e* (collectively called "102") move corresponding tire building drums 120*a*, 120*b*, 120*c*, 120*d*, 120*e* (collectively called "120") through a plurality of work stations 110*a*, 110*b*, 110*c*, 110*d* (collectively called "110"), in the direction shown by arrows 105. The AGVs 102 follow a path determined by a guide wire 104 embedded in the plant floor, shown in FIG. 1A as an oval path passing through the work stations 110 from a first work station 110*a* to a last work station 110*d*, then looping back around to the first work station 110*a*. The work stations 110 are aligned to, and spaced along, a common, linear working axis 111, and the AGV guide wire 104 is approximately parallel to the working axis 111 where the guide wire 104 passes through the work stations 110. Also parallel to the working axis 111 and passing through the work stations 110 is a rail system 130 comprising a V-rail 131 (precisely parallel to the working axis 111), a flat rail 132 (approximately parallel to the working axis 111), a V-rail entry ramp 133, a V-rail exit ramp 135, a flat rail entry ramp 134, and a flat rail exit ramp 136. Each work station 110 comprises one or more application drums 112*a*, 112*b*, 112*c*, 112*d*, 112*e*, 112*f*, 112*g* (collectively called "112"), one or more supply reels 113*a*, 113*b*, 113*c*, 113*d*, 113*e*, 113*f*, 113*g* (collectively called "113"), and an intake server 114*a*, 114*b*, 114*c*, 114*d* (collectively called "114"). The application drums 112 are precisely aligned vertically and horizontally to the working axis 111, and are positioned longitudinally along the working axis 111 relative to a work station longitudinal reference point 115*a*, 115*b*, 115*c*, 115*d* (collectively called "115") established for each work station 110, for example on a forward surface of the intake server 114. Although self-powered, and automated to follow the guide wire 104, the AGVs 102 are also subject to external control, for example by radio signal and/or proximity switches, so that the AGVs 102 can be controlled to stop at each work station 110 for a suitable amount of time before proceeding to the next work station 110.

An exemplary sequence of operations for the tire building FMS 100 is as follows, wherein a green tire carcass is built. For the first step of a green tire carcass building process, the AGV 102*a* moves an empty tire building drum 120*a* into the first work station 110*a* and stops approximately at a desired stopping point within the first work station 110*a*. The intake server 114*a* extends laterally (in the direction of the arrow 107) to a position rearward of the tire building drum 120a, couples to the tire building drum 120a while uncoupling the tire building drum 120a from the AGV 102a, and moves the tire building drum 120a into a precision longitudinal position by abutting a drum reference point against the work station longitudinal reference point 115a. Simultaneously, the tire building drum 120a is precisely aligned with the working axis 111 by the rail system 130, thereby providing precision placement in three dimensions of the tire building drum 120a relative to the application drums 112a, 112e of the first work station 110a. Now the application drums 112 can apply the first layers of tire components, pulling the components from their supply reels 113. Power and control signals are communicated to/from the tire building drum 120 by the intake server 115. For example: one innerliner is pulled from the supply reel 113e and applied by the application drum 112e, and a pair of toe guards are pulled from the (double) supply reel 113a and applied by the application drum 112a. When the application processes are completed in the workstation 110a, the intake server 114a releases the tire building drum 120a and re-couples it to the AGV 102a, uncouples and retracts to a position clear of the path of the AGVs 102 and tire building drums 120, thereby allowing the AGV 102a to move the tire building drum 120a to the next work station 110b. In order to clear the way, all AGVs 102 present in workstations 110 move approximately simultaneously, but do not have to be connected together. Alternatively, there can be gaps between AGVs 102 which allow the AGVs to move asynchronously. For the next step of the green tire carcass building process, the AGV 102a moves the tire building drum 120a into the second work station 110b whereupon operations similar to those described for the first work station 110a are performed, thereby applying further tire carcass components from the supply reels 113b, 113f of the second work station 110b. At approximately the same time, the AGV 102e has moved an empty tire building drum 102e into the first workstation 110a for application of the first tire carcass components. The above steps are repeated as the AGVs 102 move the tire building drums 120 through all of the work stations 110 in sequence, so that the tire carcass components are applied in their proper sequence on the tire building drums 120. After completion of the application of components in the last work station 110d, the built green tire carcass may be removed from the tire building drum 120 for further processing in subsequent tire manufacturing stages (not shown), thus emptying the tire building drum 120e so that it may be moved by the AGV 102e back around the path of the guide wire 104, ready to start another green tire carcass building process in the first work station 110a. An inside bead wire ring may be applied to the empty tire building drum 120e at any time after removing the built green tire carcass, conveniently as part of the carcass removal operation in the last workstation 110d.

FIG. 1B illustrates a workstation 110 with a tire building drum 120 in precision placement relative to an application drum 112 (partially shown in cutaway). The intake server 114 is extended and coupled to the tire building drum 120, thereby establishing a precise longitudinal position for the tire building drum 120. The tire building drum 120 is supported by a drum support frame 122 which in turn sits above the AGV 102. A portion of the rail system 130 comprising the V-rail 131 and the flat rail 132 is shown supporting and aligning the tire building drum 120 through skates (one flat skate 137 visible) attached to the bottom of the drum support frame 122, thereby precisely aligning the tire building drum 120 with the working axis 111, i.e., making an axis of rotation 121 of the tire building drum 120 precisely coincident with the working axis 111. An embodiment of the inventive free end support 140 is shown attached to the drum support frame 122. The free end support 140 is extended vertically so that it is in position to support and stabilize a free end 123 of the tire building drum 120 that is cantilever mounted at the other end 125 on the drum support frame 122, thereby assisting in maintaining precision alignment (i.e., coincidence) of the axis of rotation 121 of the tire building drum 120 with the working axis 111 of the workstation 110. To facilitate rotation of the tire building drum 120, the free end support 140 is engaged with a free end ring bearing 124 that is mounted on the free end 123 of the tire building drum 120.

FIG. 1C illustrates a sideview of the drum support frame 122 with important elements attached thereupon. The drum support frame 122 is shown riding on top of an AGV 102. The tire building drum 120 is cantilever mounted at one end 125 to the drum support frame 122 to allow complete rings such as tire beads to be applied during tire building, and also to allow a completed green tire carcass to be removed. The tire building drum 120 is rotatable about a central axis of rotation 121 rotating in one or more bearings (not shown) between the tire building drum 120 and the drum support frame 122. The free end ring bearing 124 is shown mounted on the free end 123 of the tire building drum 120, and the free end support 140 is shown in an extended state, engaged with the free end ring bearing 124 in order to stabilize the tire building drum 120 while also allowing the tire building drum 120 to rotate about its axis 121.

FIGS. 2A and 2B are schematic end views of a first embodiment of a free end support 240 (compare 140), mounted on a drum support frame 222 (compare 122). The drum support frame 222 is resting on an AGV 202 (compare 102), and supports a tire building drum 220 (compare 120) that is cantilever mounted upon the drum support frame 222. The free end 223 (compare 123) of the tire building drum 220 has a free end ring bearing 224 (compare 124) mounted on it. FIG. 2A shows the free end support 240 in a retracted position (or "state"), and FIG. 2B shows the free end support 240 in an extended position suitable for stabilizing the tire building drum 220 at its free end 223. The tire building drum 220 has an axis of revolution 221 (compare 121).

The first embodiment of a free end support 240 is a simple scissors-like device having first and second support arms 242a and 242b, respectfully, (collectively referred to as 242) that are comparable to scissor blades, and a scissor pivot 244 that pivotably connects the two support arms 242, with a first support arm 242a located in front of a second support arm 242b as viewed in FIGS. 2A–2B. The scissoring action is accomplished by first and second sliding blocks 246a and 246b, respectfully, (collectively referred to as 246) pivotably attached to one end of the support arms 242 and slidably connected to a slide rail 248. The first sliding block 246a is connected to the first support arm 242a, and the second sliding block 246b is connected to the second support arm 242b. It can be seen that to fully extend the free end support 240, the sliding blocks 246 must slide past each other, therefore the first sliding block 246a slides on a front side of the sliding rail 248, and the second sliding block 246b slides on a back side of the sliding rail 248. At the top of the free end support 240, each of the two support arms 242 has an arcuate cradle 243 shaped to engage with the free end ring bearing 224 in order to provide stabilizing support to the tire building drum 220. A first cradle 243a is formed on the first support arm 242a, and a second cradle 243b is formed on the second support arm 242b. The support arms 242 and cradles 243 are dimensioned so that, as the sliding blocks 246 move together, the free end support 240 will rise up and reach a maximum height "H" just as the cradles 243 engage with the free end ring bearing 224. The cradles 243 conform to the outside circumference of the free end ring bearing 224, and the maximum height H is the height needed to maintain the axis 221 of the tire building drum 220 level from the free end 223 to the cantilever mounted end of the tire building drum 220.

The extension and retraction of the free end support 240 can be automated by providing, for example, air cylinders (not shown) to move the sliding blocks 246 along the slide rail 248. It should be apparent that the free end support 240 is not likely to remain in an extended state unless some sort of latch is provided to lock it in place, resisting the forces of gravity and tire building operations which will mostly act in a way tending to push the cradles 243 away from the free end ring bearing 224, thereby "opening the scissors", i.e., retracting the free end support 240. For example, a solenoid-activated latch pin could be actuated to engage with a hole in a sliding block 246. Alternatively, air pressure in the air cylinders could be maintained to continue forcing the free end support 240 into its fully extended state against the free end ring bearing. This latter option has the disadvantage of requiring continuous air pressure that may not be available to the free end support 240 as it rides on the AGV 202 between work stations 110. Another method for locking the free end support 240 in place comprises placing it into an "overtravel" state. If there is sufficient springiness in the mechanical components of the free end support 240, then it may be possible to push the sliding blocks 246 past the point at which they cause the fullest extension of the support arms 242 and therefore begin to cause retraction of the free end support 240. If a mechanical stop (not shown) is positioned to halt sliding of the sliding blocks any further past the overtravel state, then the forces pushing the cradles away from the free end bearing ring 224 will hold the sliding blocks against the stop, thereby locking it in place without a need for continued power input.

FIGS. 3A and 3B are schematic end views of a second, preferred embodiment of a free end support 340 (compare 140), mounted on a drum support frame 322 (compare 122). The drum support frame 322 is resting on an AGV 302 (compare 102), and supports a tire building drum 320 (compare 120) that is cantilever mounted upon the drum support frame 322. The free end 323 (compare 123) of the tire building drum 320 has a free end ring bearing 324 (compare 124) mounted on it. FIG. 3A shows the free end support 340 in a retracted position (or "state"), and FIG. 3B shows the free end support 340 in an extended position suitable for stabilizing the tire building drum 320 at its free end 323. The tire building drum 320 has an axis of revolution 321 (compare 121).

FIGS. 3C and 3D are perspective end views of the preferred embodiment of a free end support 340, showing the support 340 retracted in FIG. 3C, and extended in FIG. 3D.

Referring now to FIGS. 3A–3D, the preferred embodiment of a free end support 340 is similar to a scissors-like device, but the two "scissor blades" are independently operated rather than being pivotably connected to each other. Furthermore, the free end support 340 has a more sophisticated means for accomplishing the scissoring action, a means that advantageously also provides a means of locking the support 340 into an extended state without requiring continuous power availability. The free end support 340 has first and second support arms 342a and 342b, respectfully, (collectively referred to as 342), with a first support arm 342a located in back of a second support arm 342b as viewed in FIGS. 3A–3D. First and second struts 345a and 345b, respectfully, (collectively referred to as 345), are connected between the support arms 342 and the frame 341 of the free end support 340. The first strut 345a is pivotably connected to the first support arm 342a at a first arm-strut pivot 347a (only seen in FIG. 3C), and pivotably connected at its other end to the free end support frame 341. The second strut 345b is pivotably connected to the second support arm 342b at a second arm-strut pivot 347b, and pivotably connected at its other end to the free end support frame 341. The scissoring action is accomplished by first and second sliding blocks 346a and 346b, respectfully, (collectively referred to as 346) pivotably attached to one end of the support arms 342 and slidably connected to a slide rail 348. The first sliding block 346a is connected to the first support arm 342a, and the second sliding block 346b is connected to the second support arm 342b. To extend the free end support 340 from the retracted state (see FIG. 3C) to the extended state (see FIG. 3D), the sliding blocks 346 move together, pushing the pivotably connected end of the support arms 342 horizontally. The struts 345 are inextensible, so the horizontal movement of one end of the support arms 342 is converted to vertical movement of the other end of the support arms 342.

At the top of the free end support 340, each of the two support arms 342 has an arcuate cradle 343 shaped to engage with the free end ring bearing 324 in order to provide stabilizing support to the tire building drum 320. A first cradle 343a is formed on the first support arm 342a, and a second cradle 343b is formed on the second support arm 342b. The support arms 342 and cradles 343 are dimensioned so that, as the sliding blocks 346 move together, the free end support 340 will rise up and reach a maximum height "H" just as the cradles 343 engage with the free end ring bearing 324. The cradles 343 conform to the outside circumference of the free end ring bearing 324, and the maximum height H is the height needed to maintain the axis 321 of the tire building drum 320 level from the free end 323 to the cantilever mounted end of the tire building drum 320.

The cradles 343 have arc lengths suitable for wrapping around the free end ring bearing 324 to stabilize the tire building drum 320 against movement due to lateral forces directed at angles other than vertically downward ("lateral" meaning a direction radial to the tire building drum axis of rotation 321). The first cradle 343a extends around to an angle $\alpha$ as measured from the vertically downward direction (radial to the tire building drum axis 321), and the second cradle 343b extends around to an angle $\beta$ as measured from the vertically downward direction (radial to the tire building drum axis 321). Generally the two angles $\alpha$ and $\beta$ are equal, but that is not necessary and the cradle arc length angles can be tailored to counter whatever forces and force directions are anticipated in the context of the tire building equipment 100 such as the operations of the application drums 112. Indeed, given a suitable design for the paths of the cradles 343 as the free end support 340 extends, it would be possible to completely enclose the free end ring bearing 324 by making both cradle arc length angles $\alpha$ and $\beta$ equal to 180 degrees. In the context of the present invention, arc length angles $\alpha$ and $\beta$ equal to 90 degrees or less are sufficient, and are preferably approximately 45 degrees. In other words, each cradle 343 preferably extends around the free end ring bearing 324 from zero degrees to approximately plus or minus 45 degrees from the vertically downward direction.

The extension and retraction of the free end support 340 is automated by the use of a rotary actuator 350 that is, for example, powered by air pressure. By means of an inventive set of actuator linkages 460 (see FIG. 4A), the rotary motion of the rotary actuator 350 is utilized to move the sliding blocks 346 along the slide rail 348. It should be apparent that the free end support 340 is not likely to remain in an extended state unless some sort of latch is provided to lock it in place, resisting the forces (e.g., force "F" as shown in FIG. 3B) of gravity and tire building operations which will mostly act in a way tending to push the cradles 343 away from the free end ring bearing 324, thereby "opening the scissors", i.e., retracting the free end support 340 by forcing the sliding blocks 346 apart (e.g., as shown by the horizontal force arrow "Fh"). The inventive actuator linkages 460 provides the desired latching function, as will be described hereinbelow. As best viewed in the detailed drawings of FIGS. 3C and 3D, a rotary link 352 is attached at its center to a rotary actuator shaft 353 so that the rotary link 352 will rotate along with the rotary actuator shaft 353 whenever the rotary actuator 350 causes its rotary actuator shaft 353 to rotate. Symmetrically spaced from the rotary actuator shaft 353, at opposing ends of the rotary link 352, one end each of first and second slide links 354a and 354b, respectfully, (collectively referred to as 354) is pivotably connected to the rotary link 352. The other end of each slide link 354 is pivotably connected to a sliding block 346, the first slide link 354a being pivotably connected to the first sliding block 346a, and the second slide link 354b being pivotably connected to the second sliding block 346b. It can be seen that when the free end support 340 is in the retracted state as in FIG. 3C, rotating the rotary link 352 clockwise (in the direction indicated by an arrow 355) will pull the slide links 354 in a way that causes the sliding blocks 346 to slide towards each other, thereby causing the free end support 340 to move toward the extended state shown in FIG. 3D.

The operation of the actuator linkages 460 will be described in more detail with reference to FIGS. 4A–4C that are schematic end views of a rotary link 452 (compare 352) and slide links 454 (compare 354) only, isolated from the remainder of the free end support 340 in order to allow a clear view of the operation of the actuator linkages 460. It may be noted that only one of the two slide links 454 are shown in FIG. 4C, again for the sake of clarity. The rotary link 452 is attached at its center to a rotary actuator shaft 453 (compare 353). Symmetrically spaced from the rotary actuator shaft 453, at opposing ends of the rotary link 452, one end each of first and second slide links 454a and 454b, respectfully, (collectively referred to as 454, compare 354) is pivotably connected to the rotary link 452. A first rotary link to slide link pivot 459a pivotably connects one end of the rotary link 452 to one end of the first slide link 454a. A second rotary link to slide link pivot 459b pivotably connects the opposite end of the rotary link 452 to one end of the second slide link 454b. The rotary link to slide link pivots 459a and 459b (collectively referred to as 459) are symmetrically spaced on opposing sides of the rotary actuator shaft 453 so that rotation of the rotary link 452 will cause substantially the same amount of movement for the two slide links 454. The other end of each slide link 454 is pivotably connected to a sliding block (not shown, e.g., sliding blocks 346), by a slide link to sliding block pivot 457a, 457b. The first slide link 454a is pivotably connected to the first sliding block (not shown, e.g., 346a) by the first slide link to sliding block pivot 457a, and the second slide link 354b is pivotably connected to the second sliding block (not shown, e.g., 346b) by the second slide link to sliding block pivot 457b. A horizontal line indicates the path line 449, parallel to the slide rail (not shown, e.g., 348), to which the slide link to sliding block pivots 457 are constrained to follow because they are connected to the sliding blocks (not shown, e.g., 346) that slide along the slide rail 348. Preferably, the actuator linkages 460 are arranged so that the path line 449 also passes through the center of the rotary actuator shaft 453.

FIG. 4A shows the actuator linkages 460 in position for the retracted state of the free end support 340 as shown in FIG. 3C; FIG. 4B shows the actuator linkages 460 in position as the free end support 340 is partly extended; and FIG. 4C shows part of the actuator linkages 460 in position for the extended state of the free end support 340 as shown in FIG. 3D. When the free end support 340 is in the retracted state as in FIGS. 3C and 4A, rotating the rotary link 452 in the direction indicated by an arrow 455 (compare 355) will pull the slide links 454 in a way that causes the slide link to sliding block pivots 457 to slide towards each other, thereby causing the free end support 340 to move toward the extended state as in FIGS. 3D and 4C. As described hereinabove with reference to FIG. 3B, a force F that pushes the cradle 343 away from the free end ring bearing is translated by the free end support 340 into a horizontal force Fh. In FIGS. 4B and 4C, the force Fh is shown by an arrow labeled "Fh", said arrow indicating the direction of the force Fh as it acts on the second slide link 454b through the second slide link to sliding block pivot 457b. A slide link line of effect 456 is shown passing through the centers of the second slide link to sliding block pivot 457b and the second rotary link to slide link pivot 459b. A path line to slide link angle θ shows the angular relationship between the second slide link 454b and the path line 449.

In FIG. 4B, where the free end support 340 is partly extended, the path line to slide link angle θ has a positive value (angled above the path line 449), the slide link line of effect 456 is above the center of the rotary actuator shaft 453 and therefore a resultant vertical force component Fv acting on the second rotary link to slide link pivot 459b is directed upward as shown by the arrow labeled "Fv". It can be seen that an upward-directed force Fv will oppose the rotary link 452 rotation in the direction 455. In other words, if not overpowered by the rotary actuator 350, an upward-directed force Fv will tend to retract the free end support 340.

In FIG. 4C, the free end support 340 is essentially fully extended. An extension stop 462 prevents the rotary link 452 from rotating in the direction 455 any further than shown. For example, an edge 461 of the second slide link 454b is stopped against the first rotary link to slide link pivot 459a. A feature of the present invention is that the extension stop 462 is positioned so that the actuator linkage 460 is stopped (reaches a stopping point) when the rotary link 452 has rotated far enough to be in an "overtravel" state. In other words, the path line to slide link angle θ has passed through zero degrees and is stopped at a few degrees in the negative direction (angled below the path line 449) so that the slide link line of effect 456 is below the center of the rotary actuator shaft 453 and therefore a resultant vertical force component Fv acting on the second rotary link to slide link pivot 459b is directed downward as shown by the arrow labeled "Fv" in FIG. 4C. It can be seen that a downward-directed force Fv will assist rotary link 452 rotation in the direction 455. In other words, even if the rotary actuator 350 is not powered, a downward-directed force Fv resulting from the horizontal force Fh (which results from the force F pushing cradles 343 away from the free end ring bearing 324) will act to hold the actuator linkage 460 against the extension stop 462, thereby holding the free end support 340 in an extended state, stabilizing the free end 323 of the tire building drum 320. It can be seen that the fullest extension of the free end support 340 occurs when the path line to slide link angle θ equals zero degrees, so preferably the cradles 343 are fully engaged with the free end ring bearing 324 just before (e.g., 1 to 2 degrees before) the path line to slide link angle θ equals zero degrees, and preferably the magnitude of overtravel to the stopping point is just after (e.g., 1 to 2 degrees after) the path line to slide link angle θ equals zero degrees.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. Apparatus for stabilizing a tire building drum, wherein the tire building drum has two ends, is permanently supported at a single cantilever support end, and the remaining end is a free end; the apparatus comprising:
    a free end support engaged with the free end to stabilize the tire building drum by restricting lateral movement of the free end;
    means for freeing the free end by temporarily retracting the free end support when desired;
    means for locking the free end support in place, engaged with the free end, to stabilize the tire building drum without requiring power input; wherein the means for locking comprises:
    means for moving mechanical elements that extend the free end support past the point that causes the free end support to be engaged with the free end; and
    means for providing a stop for the mechanical elements at a point such that forces resulting from lateral movement of the free end act to hold the free end support in a state of engagement with the free end.

2. Apparatus according to claim 1, wherein:
    the means for freeing the free end comprises a means for retracting the free end support to disengage the free end support from the free end in a way that allows unbroken circular objects to be applied to or removed from the tire building drum;
    the apparatus further comprising:
    control means for waiting until the free end no longer needs to be free; and
    means for extending the free end support until the free end support is engaged with the free end to stabilize the tire building drum by restricting lateral movement of the free end.

3. Apparatus according to claim 1, wherein:
    rotation of the tire building drum is allowed while the free end support is engaged with the free end.

4. Apparatus according to claim 1, wherein:
    the tire building drum is stabilized by restricting lateral movement of the free end in all directions radial to an axis of rotation of the tire building drum.

5. Apparatus according to claim 1, wherein:
    the tire building drum is stabilized by restricting lateral movement of the free end in directions radial to an axis of rotation of the tire building drum, the directions being within plus or minus 90 degrees of the vertically downward direction.

6. Apparatus according to claim 5, characterized in that:
    the directions are within plus or minus 45 degrees of the vertically downward direction.

7. Apparatus for locking a tire building drum free end support in place, extended and engaged with the free end, to stabilize the tire building drum without requiring power input, the apparatus comprising:
    two support arms that are extendable to engage with the free end;
    a sliding block connected to each support arm and sliding on a slide rail for extending the support arms;
    a rotary actuator to use power input for extending the support arms;
    actuator linkages connected between the rotary actuator and the sliding blocks for converting rotary motion to horizontal sliding motion, the actuator linkages comprising: a rotary link attached at its center to a rotary actuator shaft, a first slide link pivotably connected at one end to a first end of the rotary link and pivotably connected at the other end to a first sliding block and a second slide link pivotably connected at one end to a second end of the rotary link and pivotably connected at the other end to a second sliding block;
    rotational motion of the rotary link characterized in that:
    a rotation angle of zero degrees causes the actuator linkages to be aligned in a way that spreads the sliding blocks farthest apart, thereby fully retracting the support arms; and a rotation angle of 180 degrees causes the actuator linkages to be aligned in a way that pulls together the sliding blocks as much as possible, thereby fully extending the support arms; and
    an extension stop that stops rotation of the rotary link in an overtravel state characterized in that the rotary link has rotated past the 180 degree point that caused full extension of the support arms.

* * * * *